UNITED STATES PATENT OFFICE.

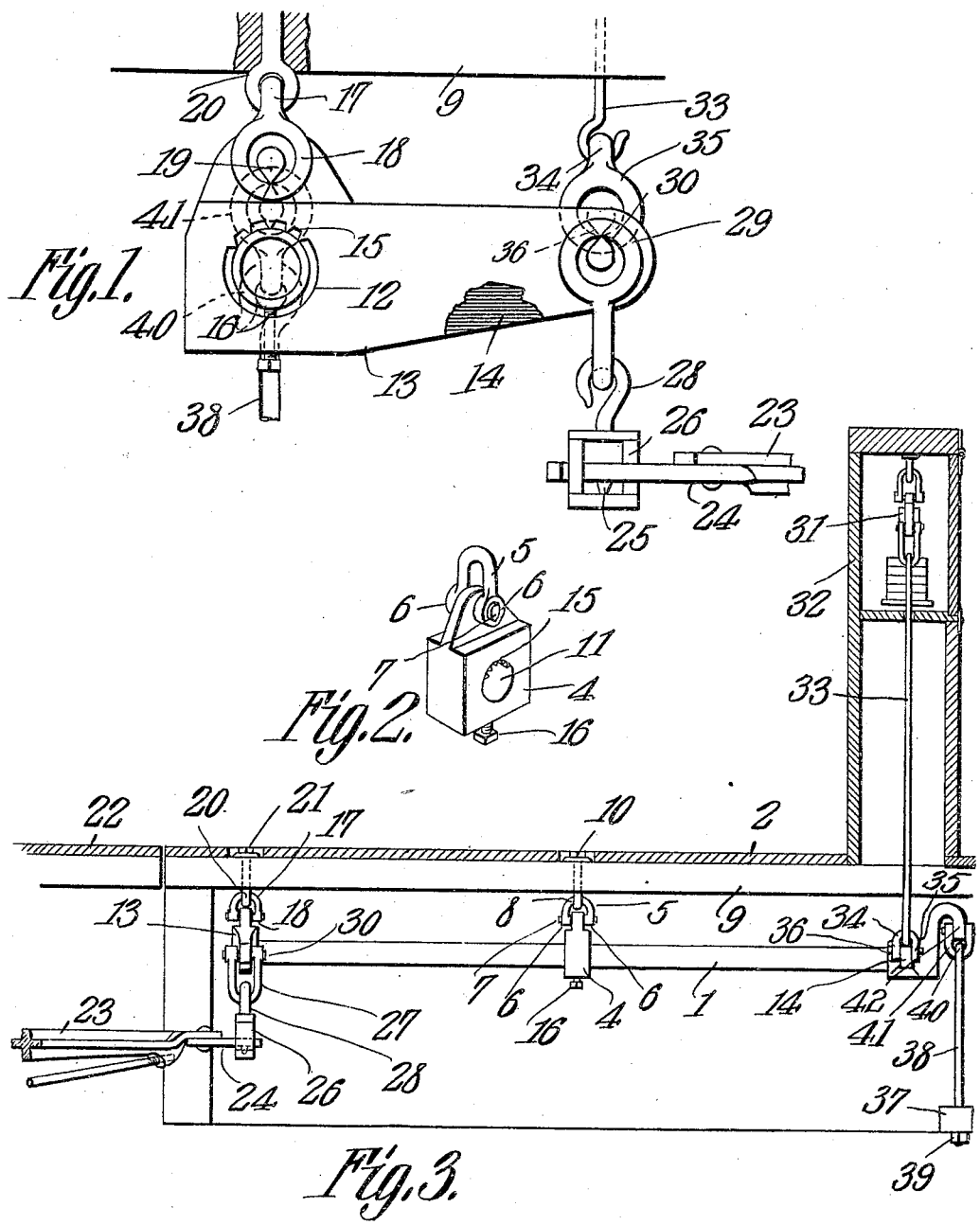

DAVID N. COLLINS, OF COLORADO SPRINGS, COLORADO.

SCALE EXTENSION.

940,130.  Specification of Letters Patent.  Patented Nov. 16, 1909.

Application filed June 9, 1908. Serial No. 437,582.

*To all whom it may concern:*

Be it known that I, DAVID N. COLLINS, a citizen of the United States, residing at Colorado Springs, in the county of El Paso and State of Colorado, have invented a new and useful Scale Extension, of which the following is a specification.

This invention relates to platform weighing scales and has for its object to provide an improved mechanism by means of which the scale beam may be effectively connected with the scale platform where the scale beam, and the scale platform are located some distance apart.

The invention further has for its object to provide an improved mechanism of this kind which will be simple in construction; will occupy little space; will have little friction, will stand a great amount of strain; and can be connected with any platform scales at any distance.

The invention consists of a scale extension for platform scales, constructed and arranged as hereinafter set forth and claimed.

Referring to the drawing:—Figure 1 is a side view of a part of the scale extension. Fig. 2 is a detail view of a support for the center of the extension. Fig. 3 is a view of the scale extension connected with a scale beam, and with a platform scales.

The scale extension is constructed with a number of pipes to form a length of tubing, as many pipes being employed as are necessary for the distance between the scale beam, and the platform scales.

Referring to Fig. 3 two pipe sections 1 are shown, which are connected together and supported beneath the floor 2 by a hanger, or support 4 suspended by a U-shaped link 5 having eyes 6 on which rest knife edges 7 on each side of the support 4, the latter being hinged to an eyebolt 8 extending through a floor beam 9, and secured by a nut and washer 10. The hanger 4 is provided with cylindrical passageways 11 in which are mounted the abutting ends of the pipe sections 1. The outer end of each of the pipes 1 is mounted in a cylindrical passageway 12 in the inner end of each of the levers 13, and 14. The pipes 1 are held from turning in the passageways 11, and 12 by means of teeth 15 in the upper side of said passageways, and a set screw 16 projecting up through the bottom of each passageway and bearing against the underside of each pipe 1. By screwing up the set screws 16, the teeth are caused to bite the pipes 1 and hold them from turning. The lever 13 is suspended at its rear end from the floor beam 9 by means of a U-shaped link 17 formed with rings 18 in each of which rests a knife edge 19, located on each side of the lever; and an eye bolt 20 extending through and secured to beam 9 by a nut 21 the link 17 being hinged to the eyebolt 20.

The lever 13 is connected with the movable supporting frame of a scale platform 22, a portion of which is shown in Fig. 3, by means of an extension or arm 23 having at its outer end a plate 24 with a knife edge 25 resting in a link 26 suspended from a U-shaped link 27, by means of a hook 28, the U-shaped link 27 having eyes or rings 29, which rest on knife edges 30 on each side of the outer end of lever 13. The lever 14 is connected with the scale beam 31 mounted in the casing 32 by means of the beam rod 33, which is connected at its lower end with a U-shaped link 34 having rings 35 on which rest knife edges 36 on each side of the outer end of lever 14. To prevent lever 14 from being moved up above the level of lever 13 by the strain on lever 13 from the scale platform 22, the lever 14 is anchored at its rear end to a beam 37 in the main frame of the scale beam and extension support by means of a rod 38 having its lower end passing through beam 37 and secured by a nut 39, and having a hook 40 at its upper end engaging a U-shaped link 41 hinged to a depending portion 42 on the rear end of lever 14. The lever 14 at its rear end is suspended from and hinged to the beam 9 similarly to lever 13 by means of a link 14' etc. It will be understood of course that the engagement of the member 40 with the eye member 41 is sufficiently loose to permit oscillation of the rod 1, and that this connection becomes more positive upon any tendency toward upward movement of the inner end of the said rod 1.

The scale platform 22 is suspended in any well known manner to move vertically, and its movement is transmitted through extension 23 to levers 13, and 14 causing them to rock on their knife edged supports, and through the scale beam rod connection to actuate the scale beam. By means of a scale extension such as hereinbefore described the action of the scale platform will be effectively and instantly transmitted at a distance to the scale beam.

Having described the invention, I claim:—

1. In a weighing scale of the character described, an extension consisting of pipe sections; a supporting frame; a lever on one end of the pipe extension hinged at its rear end to and suspended from the supporting frame; a scale platform with an extension; a hinged connection between the outer end of said lever, and the scale platform extension; a scale beam and rod; and a lever on the other end of the pipe extension hinged at its rear end to and suspended from the supporting frame, and hinged to the scale beam rod at its forward end.

2. In a weighing scale of the character described, an extension consisting of pipe sections; a supporting frame; levers on the ends of the pipe extension hinged at their rear end to and suspended from the supporting frame; hinged supporting means suspending the pipe sections between the ends of the pipe extension; a scale platform having an extension; a hinged connection between the outer end of one of the pipe levers and the scale platform extension; a scale beam and rod; and a hinged connection between the outer end of the other pipe lever, and the scale beam rod.

3. In a weighing scale of the character described, a supporting frame; an extension formed of pipe sections; a supporting member connecting the adjacent ends of the pipe sections and hinged to the supporting frame; a lever mounted on one end of the pipe extension and hinged at its rear end to and suspended from the supporting frame; a scale platform with an extension; a hinged connection between said extension, and the outer end of one of the pipe levers; a scale beam and rod; and a hinged connection between the outer end of the other pipe lever and the scale beam rod.

4. In a weighing scale of the character described, a supporting frame; a scale beam and rod; an extension consisting of pipe sections hinged to and suspended from the supporting frame; a lever on each end of the pipe extension hinged at its rear end to and supported from the supporting frame; a scale platform with an extension; a flexible hinged connection suspended from the outer end of one of the pipe levers in which connection rests the end of the scale platform extension; and a hinged connection between the outer end of the other pipe lever, and the scale beam rod.

5. In a weighing scale of the character described, a supporting frame; a scale beam and rod; an extension consisting of pipe sections hinged to and suspended from the supporting frame; a lever on each end of the pipe extension hinged at its rear end to and supported from the supporting frame; a scale platform with an extension; a hinged connection between said extension and the outer end of one of the pipe levers; a hinged connection between the other pipe lever and the scale beam rod; and means for limiting the upward movement of said pipe lever.

6. In a weighing scale of the character described, a supporting frame; a scale beam and rod; an extension consisting of pipe sections; a support for the adjoining ends of the pipe sections, hinged to the supporting frame, with means for clamping the pipe sections; a lever on each end of the pipe extension hinged at its rear end to the supporting frame, with means for clamping the extension in said levers; a scale platform with an extension; a hinged connection between said extension and the outer end of one of the pipe levers; and a hinged connection between the outer end of the other pipe lever and the scale beam rod.

7. In a weighing scale of the character described, a supporting frame; a scale beam and rod; an extension consisting of pipe sections; a support for the adjoining ends of the pipe sections hinged to the supporting frame; a lever mounted on each end of the pipe extension, a double hinged link, the lever being hinged at its rear end and suspended from the supporting frame by the double hinged link; a hinged link depending from the outer end of one of the pipe levers; a link suspended from said hinged link; a scale platform with an extension and a knife edge at its outer end resting in said suspended link; and a hinged link connecting the outer end of the other pipe lever with the scale beam rod; and knife edges upon which the several hinged parts rest.

In testimony that I claim the foregoing as my own, I have hereto affixed my signature in the presence of two witnesses.

DAVID N. COLLINS.

Witnesses:
 FREDERIC K. HASTINGS,
 ALFRED R. ALLEN.